(12) United States Patent
Morris et al.

(10) Patent No.: US 12,308,557 B2
(45) Date of Patent: May 20, 2025

(54) SLIDE ON OFF RECEPTACLE PANEL DEVICE

(71) Applicant: Jasco Products Company, LLC, Oklahoma City, OK (US)

(72) Inventors: Craig Morris, Oklahoma City, OK (US); Mark Simpkins, Oklahoma City, OK (US); Mitchell Davis, Oklahoma City, OK (US); Jordan Conner, Oklahoma City, OK (US)

( * ) Notice: Subject to any disclaimer, the term of this patent is extended or adjusted under 35 U.S.C. 154(b) by 376 days.

(21) Appl. No.: 18/078,987

(22) Filed: Dec. 11, 2022

(65) Prior Publication Data

US 2024/0195112 A1    Jun. 13, 2024

(51) Int. Cl.
    *H01R 13/506*    (2006.01)
    *H01R 13/717*    (2006.01)
    *H01R 25/00*    (2006.01)

(52) U.S. Cl.
    CPC ....... *H01R 13/506* (2013.01); *H01R 13/7175* (2013.01); *H01R 25/006* (2013.01)

(58) Field of Classification Search
    None
    See application file for complete search history.

(56) References Cited

U.S. PATENT DOCUMENTS

| | | | |
|---|---|---|---|
| 3,732,524 A | 5/1973 | Reed et al. | |
| 3,953,933 A * | 5/1976 | Goldstein | H02G 3/14 40/792 |
| 4,835,343 A * | 5/1989 | Graef | H02G 3/14 220/241 |
| 5,477,010 A * | 12/1995 | Buckshaw | H02G 3/14 174/67 |
| 5,675,125 A * | 10/1997 | Hollinger | H02B 1/26 220/241 |
| 7,102,081 B2 * | 9/2006 | Xu | H02G 3/14 174/67 |
| 7,611,364 B2 * | 11/2009 | Kidman | H02G 3/14 439/535 |
| 9,564,745 B1 | 2/2017 | Ni et al. | |
| 10,770,843 B1 * | 9/2020 | Zhang | G06F 1/26 |
| 11,063,396 B2 * | 7/2021 | Iaconis | H01R 25/006 |
| 11,532,908 B1 * | 12/2022 | Qiu | H01R 13/5213 |
| 2011/0104919 A1 * | 5/2011 | Patel | H01R 13/70 439/620.22 |

* cited by examiner

*Primary Examiner* — Tho D Ta
(74) *Attorney, Agent, or Firm* — William Popejoy

(57) ABSTRACT

The present invention comprises a receptacle base, a receptacle base mounting plate, and a replaceable receptacle panel. The invention provides a user the ability to easily remove and replace a receptacle front panel, without having to replace and rewire the entire electrical apparatus. Embodiments described for the present invention comprise a receptacle base, a receptacle base mounting plate, and a replaceable receptacle panel. The replaceable receptacle panel comprises a receptacle panel, three receptacle panel walls, a first receptacle panel securing edge, and a second receptacle panel securing edge. The replaceable receptacle panel is configured to slide on and off the receptacle base mounting plate, wherein the replaceable receptacle panel is configured to slide in the same plane as the receptacle base mounting plate. The receptacle base mounting plate comprises a recess, and a first groove and second groove configured to accommodate the first and second receptacle panel securing edge.

16 Claims, 5 Drawing Sheets

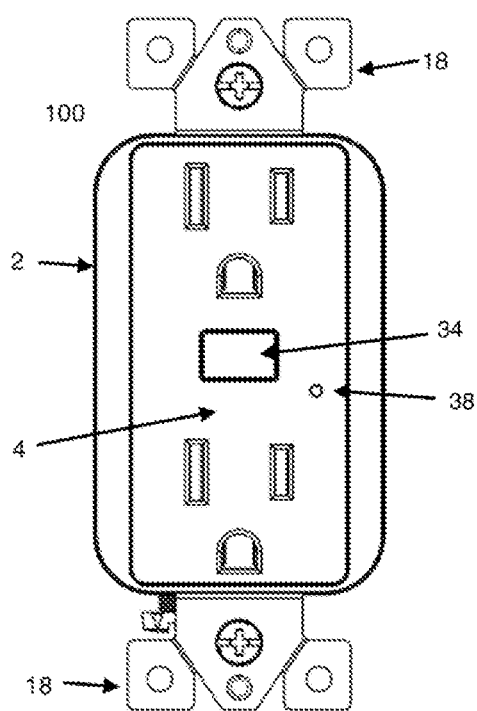
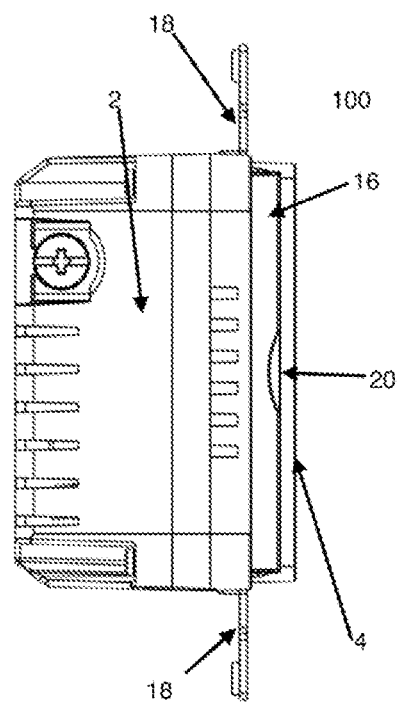
Fig. 1    Fig. 2
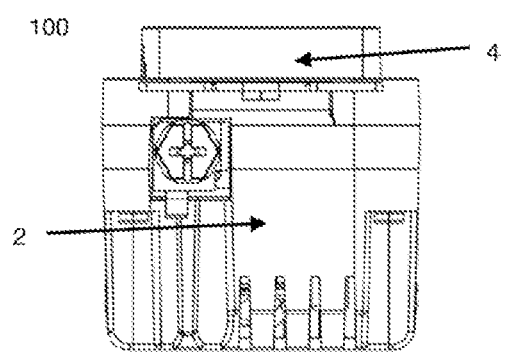
Fig. 3

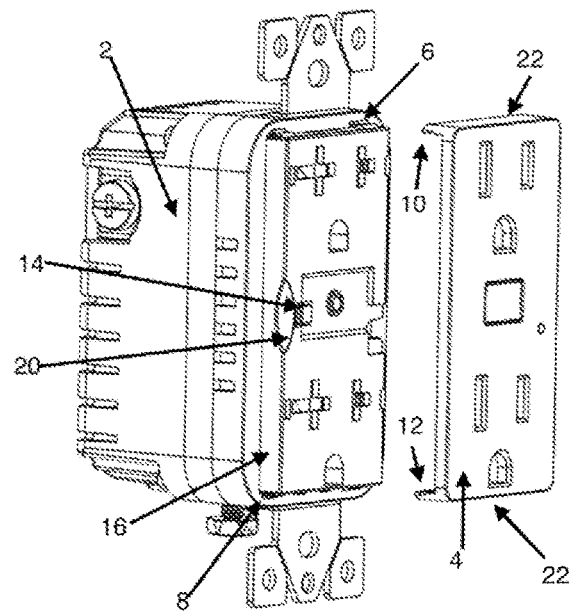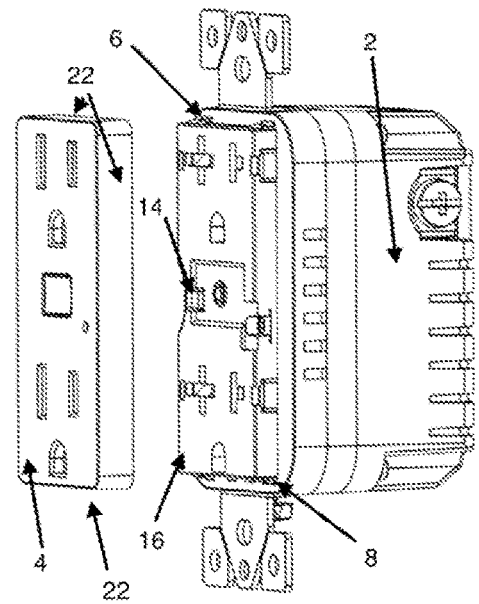
Fig. 9  Fig. 10
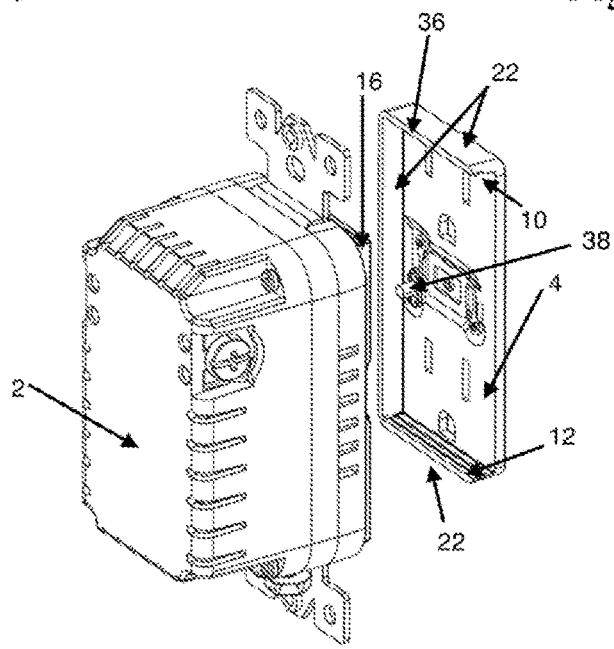
Fig. 11

SLIDE ON OFF RECEPTACLE PANEL DEVICE

BACKGROUND OF THE INVENTION

1. Field of the Invention

The present invention pertains to electrical outlets into which a plug of an electrical device may be inserted. More specifically, the invention pertains to a receptacle base and a replaceable receptacle panel.

2. Description of the Related Art

For conventional electrical outlets, the receptacle panel is integrated with the electrical device. The panel is non-replaceable, and the entire electrical outlet device must be replaced in order to change the function or the aesthetics of the receptacle panel.

Dynamic electrical solutions are highly desirable for numerous settings, including interior and exterior electrical outlets. Known prior art disclose replaceable receptacle panels by complex snap methods comprised of first and second elastic snap structures. These elastic materials are vulnerable to an eventual failure after applied stress.

U.S. Pat. No. 9,564,745 discloses a replaceable panel structure, socket, and a switch and humidity sensor with a replaceable panel. The replaceable panel structure includes a base and a panel main body, which is mounted onto the base by a snap structure.

The snap structure comprises first snap structures and second snap structures, wherein each of the first snap structures include a first elastic snap disposed on the panel main body and a stop block disposed on the base, a first slot fitted with the first elastic snap being formed on one side of the stop block away from the panel main body, and the first elastic snap being deformed due to the stop of the stop block and then snapped into or released from the first slot.

Each of the second snap structures include a second snap disposed on the panel main body and a second slot disposed on the base and fitted with the second snap. The second snap is inserted into or released from the second slot in a horizontal direction.

U.S. Pat. No. 3,732,524 discloses an electrical receptacle comprising a hollow receptacle body having an electrical plug-receiving socket member mounted therein. The socket member has openings to receive blades or prongs of an electrical male plug, with the hollow receptacle body having a side wall with a recessed portion.

Patent '524 further discloses a terminal post for receiving an electrical wire mounted in the recessed portion, a non-conducting safety plate covering said recessed portion, hinge means pivotally mounting one end of the safety plate at one end of the recess, and a catch groove in the side wall across the other end of the recess. The groove releasably holds therein the edge of the opposite end of the safety plate whereby the plate is pivotable into and out of a covering relationship with the post.

SUMMARY OF THE INVENTION

The present invention comprises a receptacle base, a receptacle base mounting plate, and a replaceable receptacle panel. The invention provides a user the ability to easily remove and replace a receptacle front panel, without having to replace and rewire the entire electrical apparatus.

Embodiments described for the present invention comprise a receptacle base, a receptacle base mounting plate, and a replaceable receptacle panel. The replaceable receptacle panel comprises a receptacle panel, three receptacle panel walls, a first receptacle panel securing edge, and a second receptacle panel securing edge. The replaceable receptacle panel is configured to slide on and off the receptacle base mounting plate, wherein the replaceable receptacle panel is configured to slide in the same plane as the receptacle base mounting plate. The receptacle base mounting plate comprises a recess, and a first groove and a second groove configured to accommodate the first receptacle panel securing edge and the second receptacle panel securing edge of the replaceable receptacle panel.

The device may comprise a snap lock, whereas the snap lock is configured to secure the replaceable receptacle panel to the receptacle base mounting plate. The replaceable receptacle panel may be configured to be removed by a tension release of the snap lock.

Embodiments of the device may comprise three receptacle panel walls, whereas each wall may be comprised of a straight terminating end, and each straight terminating end is configured to slide in constant contact across the receptacle base. The three receptacle panel walls may be configured to border the receptacle base mounting plate.

It should be appreciated that combinations of the foregoing concepts and additional concepts discussed in greater detail below are contemplated as being part of the inventive subject matter disclosed herein. In particular, all combinations of claimed subject matter appearing at the end of this disclosure, or elsewhere herein, are contemplated as being part of the inventive subject matter.

These and other systems, methods, objects, features, and advantages of the present invention will be apparent to those skilled in the art from the following detailed description of the preferred embodiment and the drawings.

BRIEF DESCRIPTION OF THE DRAWINGS

One or more embodiments are illustrated by way of example, and not by limitation, reference will now be made to the accompanying drawings, having the same numeral designations to represent like elements throughout and wherein:

FIG. 1 is a front elevational view of an embodiment of a slide on panel receptacle device;

FIG. 2 is a left side elevational view of the embodiment of the slide on panel receptacle device;

FIG. 3 is a bottom plan view of an embodiment of the slide on panel receptacle device;

FIG. 9 is an exploded view of another embodiment of a slide on panel receptacle device;

FIG. 10 is an exploded view of the embodiment of the slide on panel receptacle device;

FIG. 11 is an exploded view of the embodiment of the slide on panel receptacle device.

Figure 4:
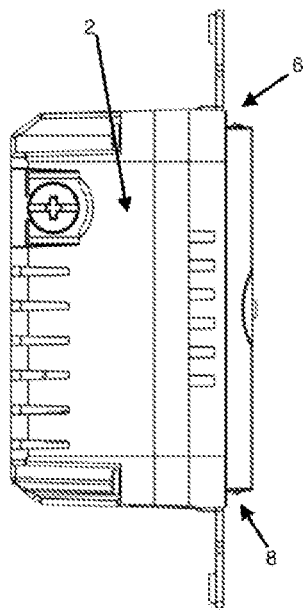
FIG. 4 is a left elevational view of an embodiment of the device comprising a receptacle base and a receptacle base mounting plate.

While the invention has been described in connection with certain preferred embodiments, other embodiments would be understood by one of ordinary skill in the art and are encompassed herein.

Elements with corresponding reference numerals:

| Slide on panel receptacle device | 100 |
| --- | --- |
| Receptacle base | 2 |
| Replaceable receptacle panel | 4 |
| First groove | 6 |
| Second groove | 8 |
| First receptacle panel securing edge | 10 |
| Second receptacle panel securing edge | 12 |
| Snap lock | 14 |
| Receptacle base mounting plate | 16 |
| Mounting bracket | 18 |
| Recess | 20 |
| Receptacle panel walls | 22 |
| Power button | 26 |
| LED indicator | 28 |
| Mounting plate panel guide | 30 |
| Mounting bracket power button recess | 32 |
| Receptacle panel power button | 34 |
| Straight terminating panel wall end | 36 |
| LED lightpipe | 38 |

DETAIL DESCRIPTION OF THE INVENTION

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in order to facilitate describing the subject innovation. Moreover, it is to be appreciated that the drawings may not be to scale.

FIG. 1 is a front elevational view of an embodiment of a slide on panel receptacle device 100. A replaceable receptacle panel 4 is affixed to a receptacle base, allowing a user the ability to remove and replace the panel of a receptacle while the receptacle base 2 remains in place and hard-wired to the leads within an electrical box (not shown). A mounting bracket 18 affixes the device 100 to a standard electrical box. A receptacle panel power button 34 provides a user the ability to turn the device on and off. When pressed, the receptacle panel power button contacts and presses the power button 26 (not shown) of the device. A LED indicator light 28 through a LED lightpipe 38, informs the user of a current state of power supplied within the device.

FIG. 2 is a left side elevational view of the embodiment of the slide on panel receptacle device 100. A receptacle base mounting plate 16 extends from a receptacle base 2. The replaceable receptacle panel 4 slides onto and is supported by the receptacle base mounting plate of the device. For removal of the receptacle panel, a recess 20 of the receptacle base mounting plate provides access to the back of the replaceable receptacle panel, where a small force may be applied to release a snap lock (not shown). The recess 20 may be configured to accommodate a thumb, finger, or tool. The panel slides away from the recess and in the same plane as the receptacle base mounting plate.

Figure 5:
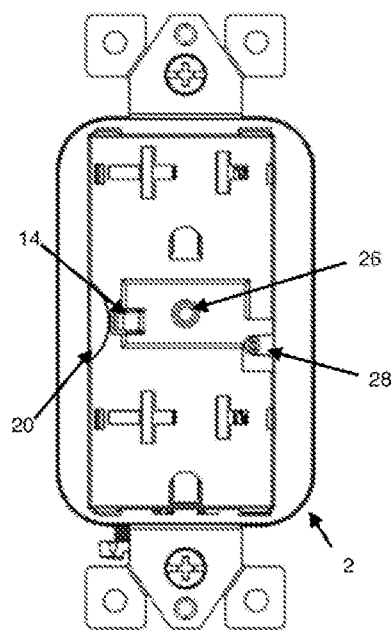
FIG. 5 is a front elevational view of an embodiment of the device comprising a receptacle base and a receptacle base mounting plate.
Figure 6:
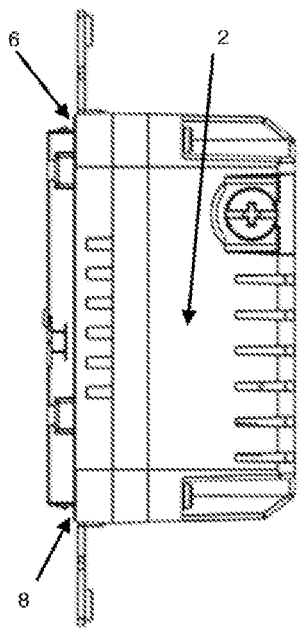
FIG. 6 is a right elevational view of an embodiment of the device comprising a receptacle base and a receptacle base mounting plate.

FIG. 4 through FIG. 6 is an embodiment of the device comprising a receptacle base and a receptacle base mounting plate. FIG. 5 shows a front elevational view of an embodiment of the device. In this embodiment, the recess 20 is carved within the left side of the receptacle base mounting plate, accommodating a right-handed user. Alternate embodiments may place the recess in alternate locations within the mounting plate. In this embodiment, a snap-lock 14 is located on the left front side of the receptacle base mounting plate. A power button 26, turns power distribution to the receptacles on and off.

FIG. 6 is a right elevational view of the receptacle device. A first groove 6 and a second groove 8 of the receptacle base mounting plate accommodate a removable receptacle panel (not shown). The first groove and second groove may run the width of the mounting plate and facilitate the installation and removal of the replaceable receptacle panel by guiding the panel to move in the same plane as the receptacle base mounting plate. The first groove and second groove create a physical barrier which secure at least one end of the replaceable receptacle panel to the receptacle base mounting plate.

Figure 7:
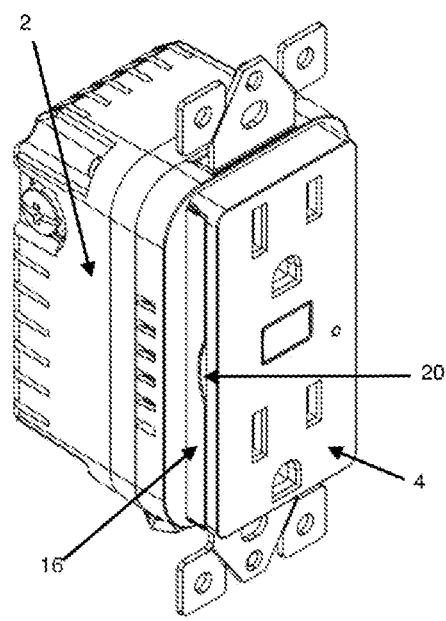
FIG. 7 is a perspective view of another embodiment of a slide on panel receptacle device.
Figure 8:
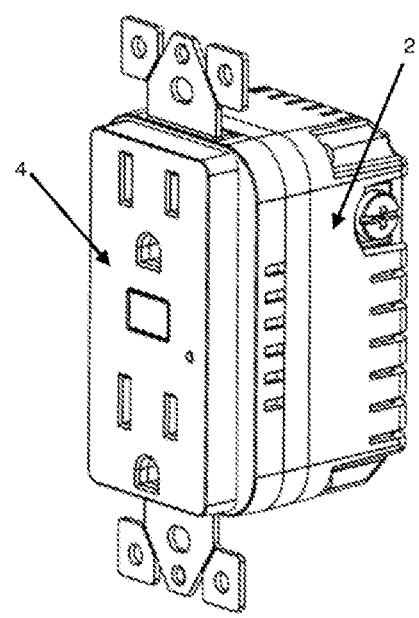
FIG. 8 is a perspective view of the embodiment of the slide on panel receptacle device.
Figure 12:
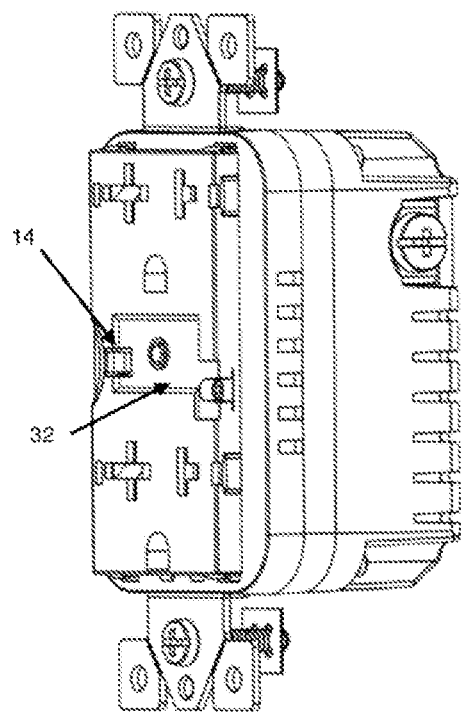
FIG. 12 is a perspective view of an embodiment of the device comprising a receptacle base and a receptacle base mounting plate.

FIG. 7 is a perspective view of an embodiment of the slide on panel receptacle device. The perspective view provides clarity to the structural relationship between the receptacle base mounting plate 16 and the replaceable receptacle panel 4. In this embodiment, the recess 20 allows access to the rear of the replaceable receptacle panel 4.

FIG. 9 through FIG. 11 are exploded views of an embodiment of the device, where the replaceable receptacle panel 4 is separated from the receptacle base mounting plate 16. In FIG. 9, for installation of the replaceable receptacle panel, the panel is held within the same plane and to the right of the receptacle base mounting plate. The panel is slid to the left towards the mounting plate, and a first groove 6 and a second groove 8 accommodate a first receptacle panel securing edge 10 and a second receptacle panel securing edge 12 of receptacle panel walls 22. The panel may slide continuously until the snap lock 14 accommodates the back of the receptacle panel power button.

The snap lock may be spring loaded and comprised of multiple surface angles which aide in securing the panel to the mounting plate. The surface angles of the snap lock may be comprised of angles greater than 180 degrees and less than 180 degrees. The receptacle panel walls border the receptacle base mounting plate, providing structural stability for the replaceable receptacle panel 4. The mounting bracket power button recess 32 is configured to accommodate the back of the receptacle panel power button.

In the FIG. 11 embodiment, three receptacle panel walls are comprised of straight terminating ends, whereas each straight terminating end is configured to slide evenly across a receptacle base. A first receptacle panel securing edge 10 and a second receptacle panel securing edge 12 of the receptacle panel walls aide in securing the replaceable receptacle panel to the receptacle base mounting plate.

Figure 13:
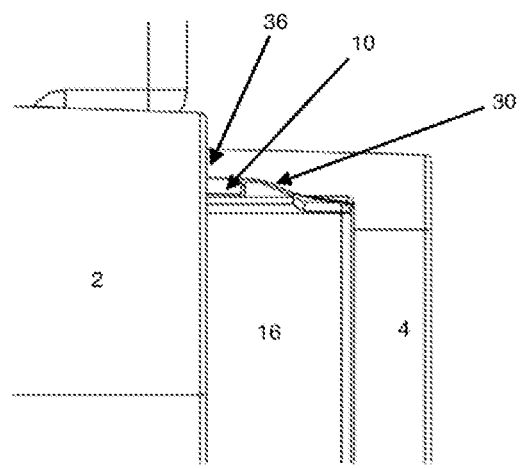
FIG. 13 is a left side elevational view of an embodiment of the slide on panel receptacle device.

FIG. 13 is a left side elevational view of the first receptacle panel securing edge 10, mounting plate panel guide 30, and the straight terminating panel wall end 36. In this embodiment, the straight terminating panel wall end 36 is configured to slide in constant contact with the receptacle base 2 when the panel is installed or removed. The mounting plate panel guides 30 extend from the mounting plate and provide support for the first receptacle panel securing edge as it slides across the mounting plate. Not shown, mounting plate panel guides 30 may extend from the mounting plate and provide support for the second receptacle panel securing edge as it slides across the mounting plate. Each receptacle panel wall comprises a straight terminating panel wall end.

Although the present invention has been described in relation to particular embodiments thereof, many other variations and modifications will become apparent to those skilled in the art. It is preferred, therefore, that the present invention be limited not by the specific disclosure herein, but only by the appended claims. Alternate embodiments may be devised without departing from the spirit or scope of the invention. Further, the particular feature or structure may be combined in any suitable manner in one or more embodiments.

What is claimed is:

1. A slide on receptacle panel device, comprising:
   a receptacle base;
   a receptacle base mounting plate;
   a replaceable receptacle panel;
   the replaceable receptacle panel comprises: a receptacle panel, three receptacle panel walls, a first receptacle panel securing edge, and a second receptacle panel securing edge;
   the receptacle base mounting plate comprises: a recess, a first groove and a second groove configured to accommodate the first receptacle panel securing edge and the second receptacle panel securing edge of the replaceable receptacle panel;
   the replaceable receptacle panel configured to slide on and off the receptacle base mounting plate, wherein the replaceable receptacle panel is configured to slide in the same plane as the receptacle base mounting plate; and
   the first receptacle panel securing edge and the second receptacle panel securing edge both configured to maintain equal contact with the receptacle base mounting plate throughout installation and removal.

2. The slide on receptacle panel device of claim 1, further comprising:
   a snap lock;
   the snap lock configured to secure the replaceable receptacle panel to the receptacle base mounting plate; and
   the replaceable receptacle panel configured to be removed by a tension release of the snap lock.

3. The slide on receptacle panel device of claim 1, further comprising:
   the three receptacle panel walls each comprised of a straight terminating end, whereas at least two straight terminating ends are configured to slide in constant contact with the receptacle base throughout installation and removal.

4. The slide on receptacle panel device of claim 1, further comprising:
   the three receptacle panel walls configured to border the receptacle base mounting plate on three of the sides of the receptacle base mounting plate.

5. The slide on receptacle panel device of claim 1, further comprising:
   one or more mounting plate panel guides.

6. A slide on receptacle panel device, comprising:
   a receptacle base;
   a receptacle base mounting plate; and the receptacle base mounting plate comprises: a first groove and a second groove configured to accommodate a first receptacle panel securing edge and a second receptacle panel securing edge of a replaceable receptacle panel; and
   a replaceable receptacle panel;
   the replaceable receptacle panel comprises: a receptacle panel, three receptacle panel walls, and the replaceable receptacle panel configured to slide on and off the receptacle base mounting plate, wherein the replaceable receptacle panel is configured to slide in the same plane as the receptacle base mounting plate.

7. The slide on receptacle panel device of claim 6, further comprising:
   a recess.

8. The slide on receptacle panel device of claim 6, further comprising:
   a snap lock;
   the snap lock configured to secure the replaceable receptacle panel to the receptacle base mounting plate; and
   the replaceable receptacle panel configured to be removed by a tension release of the snap lock.

9. The slide on receptacle panel device of claim 6, further comprising:
   a replaceable receptacle panel;
   the replaceable receptacle panel comprises: a receptacle panel, three receptacle panel walls,
   the replaceable receptacle panel configured to slide on and off the receptacle base mounting plate, wherein the replaceable receptacle panel is configured to slide in the same plane as the receptacle base mounting plate;
   a snap lock;
   the snap lock configured to secure the removable receptacle panel to the receptacle base mounting plate; and
   the replaceable receptacle panel configured to be removed by a tension release of the snap lock.

10. The slide on receptacle panel device of claim 6, further comprising:
    three receptacle panel walls; and
    the three receptacle panel walls each comprised of a straight terminating end, whereas at least two straight terminating ends are configured to slide in constant contact with the receptacle base.

11. The slide on receptacle panel device of claim 6, further comprising:
    one or more mounting plate panel guides.

12. A slide on receptacle panel device, comprising:
    a receptacle base;
    a replaceable receptacle panel; and
    the replaceable receptacle panel comprises: a receptacle panel, three receptacle panel walls, a first receptacle panel securing edge, and a second receptacle panel securing edge;
    the replaceable receptacle panel configured to slide on and off a receptacle base mounting plate, wherein the replaceable receptacle panel is configured to slide in the same plane as the receptacle base mounting plate; and
    the first receptacle panel securing edge and the second receptacle panel securing edge both configured to maintain equal contact with the receptacle base mounting plate during installation and removal.

13. The slide on receptacle panel device of claim 12, further comprising:
    a receptacle base mounting plate; and
    the receptacle base mounting plate comprises: a recess, and a first groove and a second groove configured to accommodate the first receptacle panel securing edge and the second receptacle panel securing edge of the replaceable receptacle panel.

14. The slide on receptacle panel device of claim 12, further comprising:
    a snap lock;

the snap lock configured to secure the replaceable receptacle panel to the receptacle base; and the replaceable receptacle panel configured to be removed by a tension release of the snap lock.

15. The slide on receptacle panel device of claim 12, further comprising:

three receptacle panel walls; and the three receptacle panel walls each comprised of a straight terminating end, whereas at least two straight terminating ends are configured to slide in constant contact with the receptacle base.

16. The slide on receptacle panel device of claim 12, further comprising:

one or more mounting plate panel guides.

\* \* \* \* \*